United States Patent [19]
Ohta

[11] Patent Number: 5,130,970
[45] Date of Patent: Jul. 14, 1992

[54] OPTICAL RECORDING APPARATUS AND OPTICAL DISK

[75] Inventor: Minemasa Ohta, Yamanashi, Japan

[73] Assignee: Pioneer Electronic Corporation, Tokyo, Japan

[21] Appl. No.: 432,827

[22] Filed: Nov. 7, 1989

[30] Foreign Application Priority Data

Dec. 15, 1988 [JP] Japan .................................. 63-317709

[51] Int. Cl.[5] ................................................ G11B 7/00
[52] U.S. Cl. ......................................... 369/100; 369/50; 369/54; 369/59; 369/109; 369/116
[58] Field of Search ............... 369/109, 44.26, 44.34, 369/59, 62, 275.3, 275.4, 100, 54, 50, 116, 47, 48, 44.23, 44.37, 44.38

[56] References Cited

U.S. PATENT DOCUMENTS 4,783,774  11/1988  Enomoto ........................... 369/50
5,003,527   3/1991  Matsumoto et al. ............. 369/109

FOREIGN PATENT DOCUMENTS 63-53760    3/1988  Japan .
63-278200  11/1988  Japan .

Primary Examiner—Roy N. Envall, Jr.
Assistant Examiner—Hung Dang
Attorney, Agent, or Firm—Sughrue, Mion, Zinn Macpeak & Seas

[57] ABSTRACT

Apparatus and method for forming pits in an optical disk and the resulting disk. The preformed pits in the disk are adjusted to suppress the hump phenomenon by adjusting the amplitude and duty cycle of the standard modulating pulses. The amount of adjustment depends upon the duration of the standard pulses applied.

7 Claims, 4 Drawing Sheets

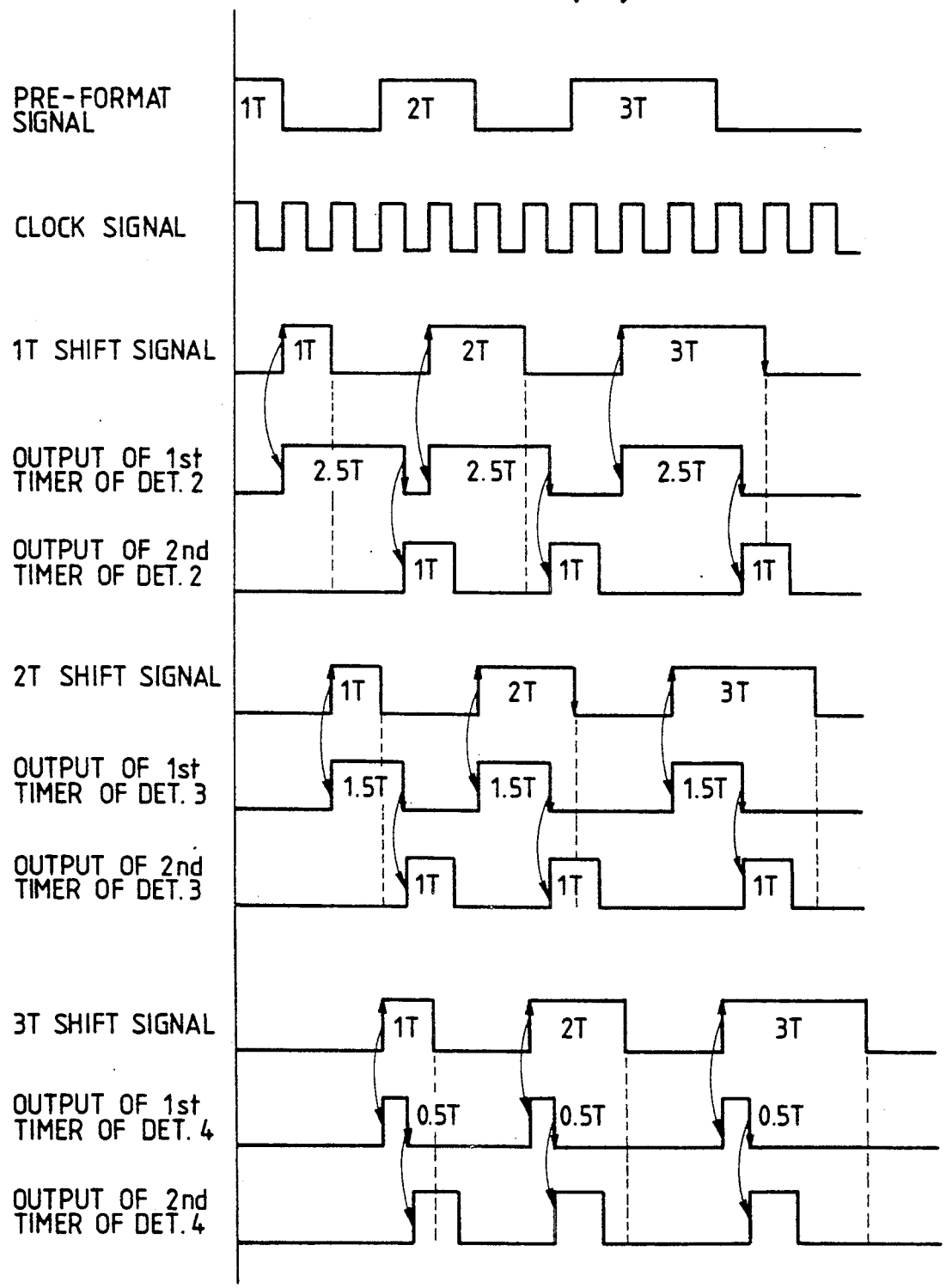

THE SHAPES OF PITS OF THE PRESENT INVENTION

OPTICAL RECORDING APPARATUS AND OPTICAL DISK

BACKGROUND OF THE INVENTION

The present invention relates to an optical recording apparatus for forming a row of pits in an optical recording medium in accordance with signals in the form of a pulse train, and relates to an optical disk produced by this optical recording apparatus.

Optical disks and magnetooptical disks respectively utilizing optical and magnetooptical signal recording-/reproducing methods are known in the art. Such optical recording media include those of the so-called ROM type, P-ROM type, RAM type, etc. In order to realize interchangeability among the various optical recording media, a sampling servo system disclosed, for example, in Japanese Patent Unexamined Publication No. 63-53760, has been proposed. In the sampling servo system, a servo region including so-called pre-pits for forming servo signals (hereinafter, referred to as a pre-format signal) at predetermined intervals or predetermined angles is previously recorded on a concentric or spiral track on a disk, similarly to the case of a so-called sector servo system used in a hard disk or a magnetic disk, so that when the disk is rotated servo control is continuously performed by sampling and holding the foregoing discrete servo signals.

The sampling servo system uses a 4/15 modulation system which has a feature in that logic "1" can be continued, at maximum, in three of the data bits carried by a recording signal. An example of such a recording signal is shown in FIG. 7 of Japanese Patent Application No. 63-278200 (corresponding to U.S. patent application Ser. No. 344,866). Therefore, the pre-format signal includes a 1T signal having a basic pulse duration corresponding to one bit of logic "1", a 2T signal having a pulse duration twice as large as the basic pulse duration corresponding to two bits of logic "1", and a 3T signal having a pulse duration three times as large as the basic pulse duration corresponding to three bits of logic "1".

In a process for producing a master disk having pre-format signals formed thereon, an optical modulator is controlled on the basis of a pre-format signal having a predetermined level so as to modulate the intensity of a laser beam. The modulated laser beam is focused onto the disk to thereby form pits on the disk. The various length pits formed in the disk surface also differ in width and in length to width ratio, as shown in FIG. 3. The width and length among the 1T, 2T and 3T pits satisfy the relations $W_1<W_2<W_3$ and $L_1<L_2<L_3$, respectively, where $W_1$, $W_2$ and $W_3$ represent the respective widths in the radial direction of pits 1T, 2T and 3T, and $L_1$, $2L_2$ and $3L_3$ represent the respective lengths in the circumferential directions of pits 1T, 2T, and 3T.

The respective widths of the 2T and 3T pits are unevenly increased, so that a signal level phenomenon called "hump" appears in a pit readout signal as shown in FIG. 4. The hump becomes one of the causes of a data read error. If the cutting power of the laser beam is set sufficiently low to suppress any increase in pit width, the level of a crosstalk component contained in a read signal obtained from a 1T clock pit is reduced. The crosstalk in off-track is used for extracting a system clock when the tracking servo is released to perform high-speed access as shown in FIG. 5, and therefore the reduction in level of the crosstalk component is disadvantageous. Further, since a 1T signal is standardized so as to have a half-amplitude level, it is difficult to eliminate the hump phenomenon.

SUMMARY OF THE INVENTION

It is therefore an object of the present invention to eliminate the foregoing disadvantages in the prior art.

It is another object of the present invention to provide an optical disk having excellent characteristics. The optical disk has optimum pits for generating a modulated light signal in response to the pulse duration of the pulses in a pulse train. The pulse duration varies in units of minimum pulse period 1T.

According to an aspect of the present invention, the optical recording apparatus for forming a row of pits in an optical recording medium in accordance with a plurality of pulse signals which vary in pulse duration in units of a minimum time length, comprises: a pulse duration detection means for detecting the pulse duration of the pulse signal; a duty ratio adjustment means for adjusting a duty ratio of the pulse signal in accordance with the detected pulse duration; a pulse amplitude adjustment means for adjusting an amplitude of the pulse signal in accordance with the detected pulse duration; and a light irradiation means for irradiating the optical recording medium with a light beam modulated by the pulse signal having a duty ratio adjusted by the duty ratio adjustment means and having an amplitude adjusted by the pulse amplitude adjustment means while rotating the optical recording medium.

According to another aspect of the present invention, the optical recording apparatus for forming a row of pits by irradiating an optical disk with a light beam modulated by a plurality of pulse signals which vary in pulse duration in units of minimum time length, while the optical disk is being rotated, comprises: a pulse duration detection means for detecting the pulse duration of the pulse signal; an irradiated position detection means for detecting an irradiated position of the disk irradiated with the light beam in the radial direction of the disk; a duty ratio adjustment means for adjusting a duty ratio of the pulse signal in accordance with the detected pulse duration and the detected irradiated position; a pulse amplitude adjustment means for adjusting an amplitude of the pulse signal in accordance with the detected pulse duration and the detected irradiated position; and means for supplying the pulse signals each having a duty ratio adjusted by the duty ratio adjustment means and having an amplitude adjusted by the pulse amplitude adjustment means to a light modulation means for modulating intensity of the light beam.

According to a further aspect of the present invention, the optical disk has pits which are circumferentially formed thereon by a modulated light beam so that the pits vary in their circumferential length at every minimum time length, and each of the pits is substantially uniform in width in the radial direction of the disk at its front edge portion, at its central portion, and at its rear edge portion.

BRIEF DESCRIPTION OF THE DRAWINGS

These and other features, objects and advantages of the present invention will be apparent from the following detailed description with reference to the accompanying drawings; wherein.

DETAILED DESCRIPTION OF THE PREFERRED EMBODIMENT

Figure 1:
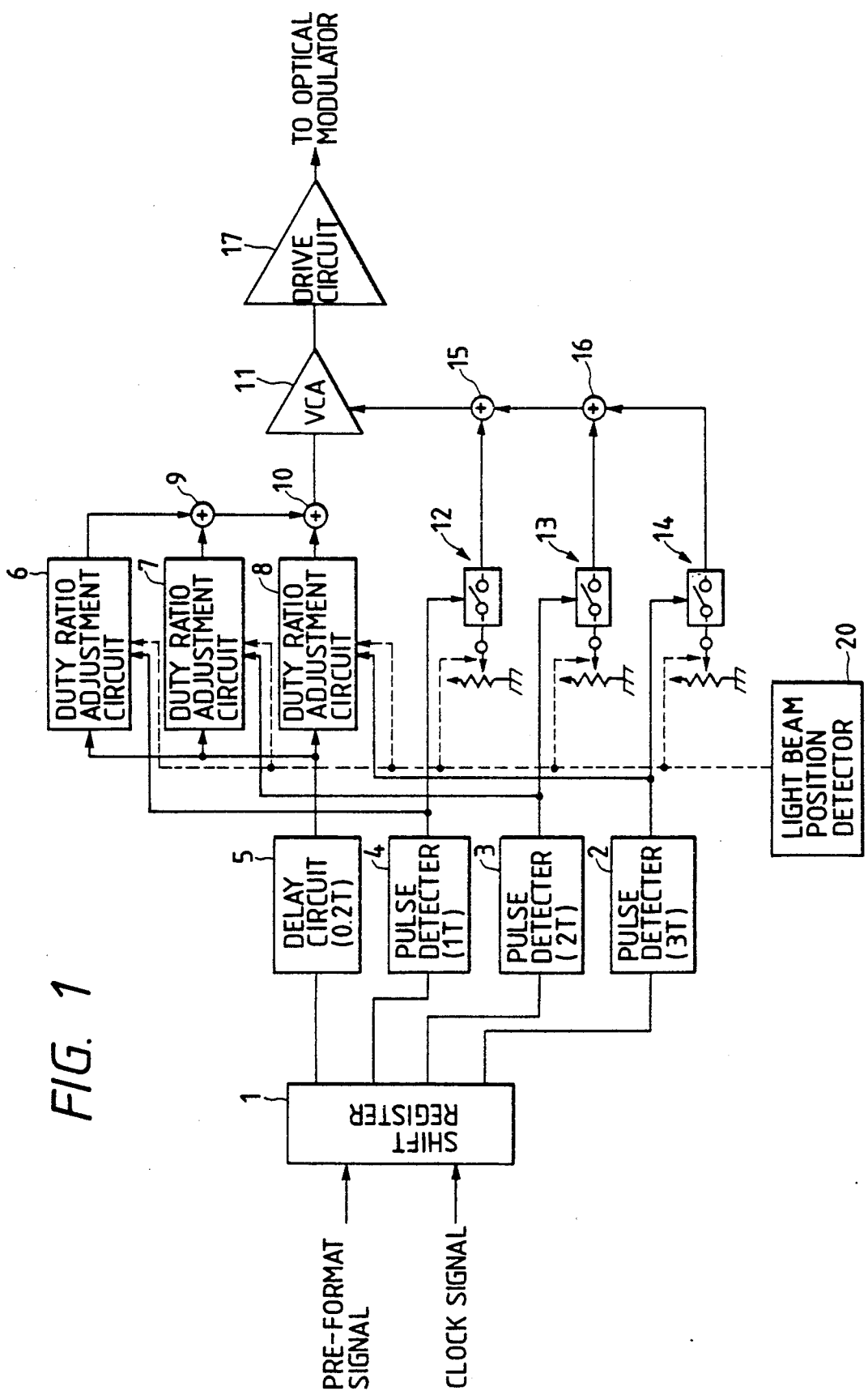
FIG. 1 is a block diagram showing an embodiment of the optical recording apparatus according to the present invention.

Referring to FIG. 1, an embodiment of the optical recording apparatus according to the present invention will be described hereunder.

In FIG. 1, a pre-format signal, having a TTL level generated by a pre-format signal generator (not shown), and a clock signal are supplied to the data input terminal and clock input terminal, respectively, of a shift register 1. The pulse durations of 1T, 2T and 3T pulses contained in the pre-format signal have been determined on the basis of the clock signal. That is, pulse 1T has a width equal to one clock period; pulse 2T has a width equal to two clock periods; pulse width 3T has a width equal to three clock periods. Further, the interval between the pulses equals two clock periods.

The shift register 1 generates four delayed signal outputs. That is, the shift register 1 generates a 1T shift signal obtained by delaying the pre-format signal by a time corresponding to the pulse duration of the 1T pulse, a 2T shift signal obtained by delaying the pre-format signal by a time corresponding to the pulse duration of the 2T pulse, a 3T shift signal obtained by delaying the pre-format signal by a time corresponding to the pulse duration of the 3T pulse, and a 4T shift signal obtained by delaying the pre-format signal by a time corresponding to the pulse duration of the 4T pulse.

The 1T shift signal is supplied to a 3T pulse detector 2, which detects the presence of a 3T pulse. The 2T shift signal is supplied to a 2T pulse detector 3, which detects the presence of a 2T pulse. The 3T shift signal is supplied to a 1T pulse detector 4, which detects the presence of a 1T pulse. The 4T shift signal is supplied to a delay circuit 5 for delaying a signal by a time corresponding to 0.2T.

Detector 2, upon detection of a 3T pulse in the applied pulse train, generates a 3T window pulse which begins at the trailing edge of the 3T detected pulse and lasts for a period of 3.4T. In a like manner, detectors 3 and 4 generate windows of 2.4T and 1.4T, respectively, starting at the trailing edges of the respective 2T and 1T pulses detected thereby.

The timing of the window pulses and their respective lengths results in each window pulse effectively surrounding its corresponding 4T delayed pre-format pulse out of delay circuit 5. Thus, the 3.4T window starts 0.2T prior to the 3T pre-format pulse and ends 0.2T after the termination of the 3T pre-format pulses 2.4T and 1.4T and pre-format pulses 2T and 1T. This relation can be seen in the sixth through ninth waveforms FIG. 2(A).

The window pulse produced from the 3T pulse detector 2 is supplied to the operation input terminal of a duty ratio adjustment circuit 8 for adjusting the duty ratio of a supplied pulse signal. The 3.4T window pulse is also supplied to the operation input terminal of a gain control signal generation circuit 14 for generating a gain control signal for adjusting pulse amplitude. The window pulse produced from the 2T pulse detector 3 is supplied to the operation input terminal of a duty ratio adjustment circuit 7 and to the operation input of a gain control signal generation circuit 13. The window pulse produced from the 1T pulse detector 4 is supplied to the operation input terminal of a duty ratio adjustment circuit 6 and the operation input terminal of a gain control signal generation circuit 12. The respective gain control signal outputs of the gain control signal generation circuits 12 through 14 are applied via adders 15 and 16 to the gain control input terminal of a voltage control variable gain amplifier (hereinafter, referred to as a VCA) 11.

Figure 4:
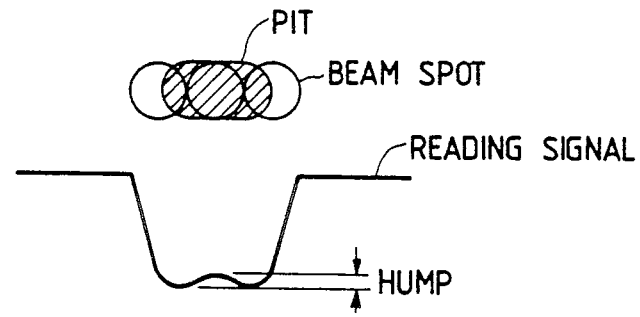
FIG. 4 is a diagram for explaining the hump phenomenon.
Figure 5:
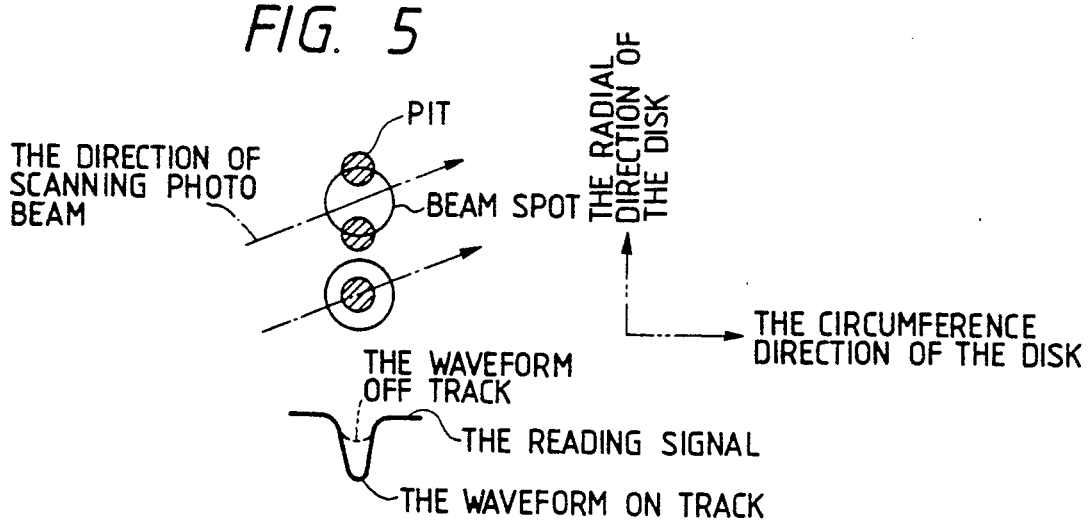
FIG. 5 is a diagram for explaining crosstalk.

The output signal of the delay circuit 5 is supplied to the signal input terminals of the duty ratio adjustment circuits 6 and 7 having a configuration as shown, for example, in FIG. 4 of the foregoing Japanese Patent Application No. 63-278200. The duty ratio adjustment circuit 6 decreases the duration of the 1T pulse signal supplied from the delay circuit 5 by a predetermined quantity in response to the window pulse supplied from the 1T pulse detector 4. The duty ratio adjustment circuits 7 and 8 increase and decrease, respectively, the duration of the 2T and 3T pulses by predetermined quantities in response to the window pulses supplied from the 2T pulse detector 3 and the 3T pulse detector 2, respectively. The pulse signals having duty ratios adjusted by the duty ratio adjustment circuits 6, 7 and 8, respectively, are applied through adders 9 and 10 to the signal input terminal of the VCA 11.

In the case of an optical disk of the CAV (constant angular velocity) type, the pit length of a pit to be recorded is made shorter as the recording position of the pit comes near to the inner circumference of the disk from the outer circumference of the same.

In order to make the adjustment more suitable in this case, a light beam position detector 20 is provided so that the recording position of the light beam in the radial direction of the disk is detected and a signal corresponding to the radial recording position is supplied to the duty ratio adjustment circuits 6, 7 and 8 and the gain control signal generation circuits 12 through 14.

Then, the circuits 6, 7 and 8 and the circuits 12 through 14 set the duty ratio and level of a pulse signal taking into consideration the recording position in the radial direction of the disk. For example, the duty ratio and pulse amplitude are adjusted so as to increase the level of a read signal of 1T pit because the level of the read signal becomes low at the inner circumference of the disk. The light beam position detector 20 may be constituted, for example, by one or more switches actuated by a pickup (not shown) moving to the radial direction of the disk.

The VCA 11 amplifies the pulse-train signal applied thereto in accordance with the gain represented by the gain control signal so as to vary the amplitude of the pulse-train signal. The pulse signal output of the VCA 11 is power-amplified by a drive circuit 17, and the amplified output is supplied to the control input terminal of an optical modulator (not shown). The optical modulator modulates the intensity of a laser beam irradiating a rotating optical disk in accordance with the pulse-train signal having the adjusted pulse duration and amplitude. Pits are formed on the optical disk by the laser beam.

Figure 2A:
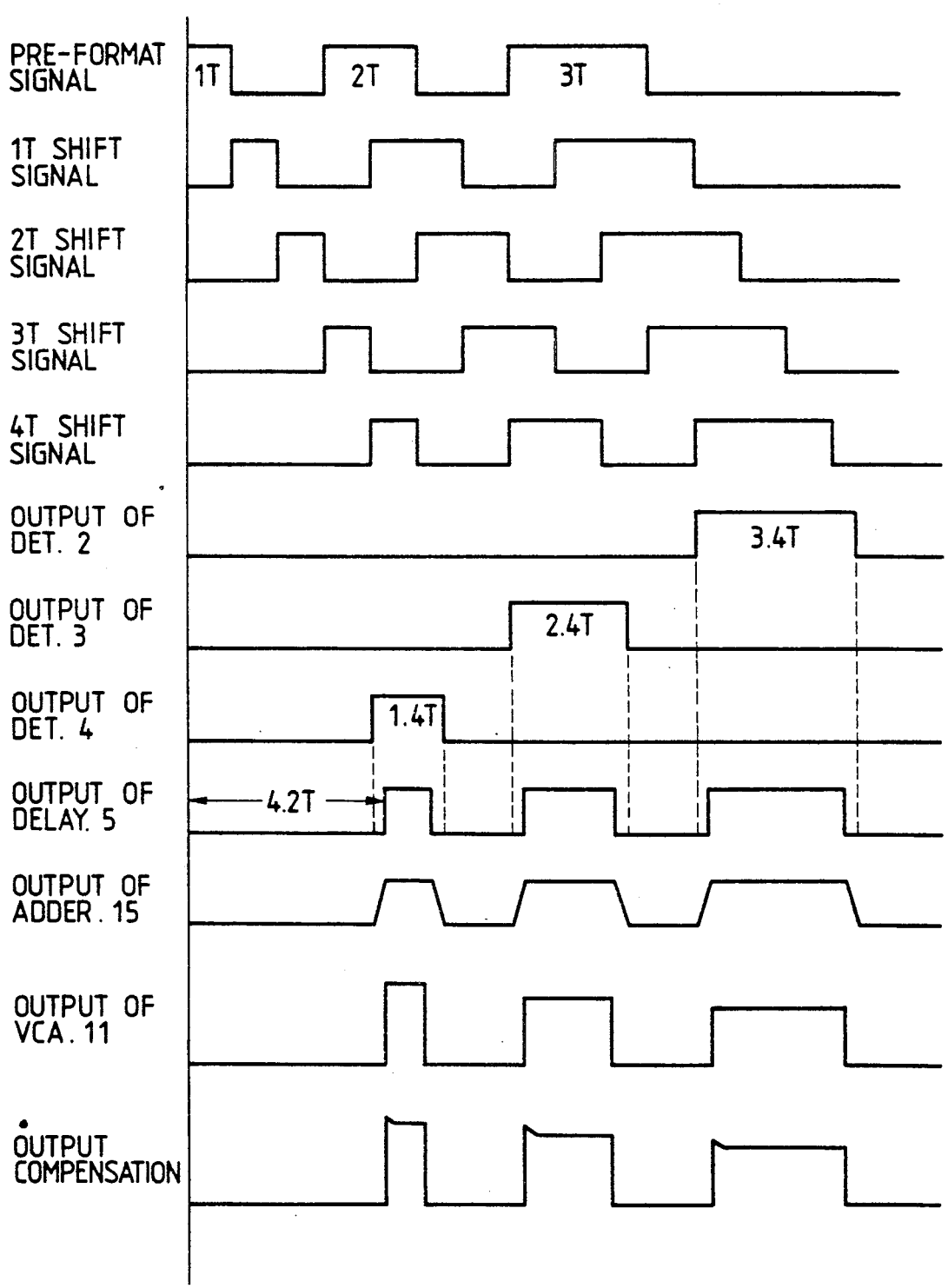
FIG. 2(A) is a diagram of waveforms for explaining the operation of the optical recording apparatus according to the present invention.

Referring to FIG. 2(A), the operation of the apparatus according to the present invention will be described hereunder.

The 1T pulse contained in the pre-format signal has a pulse duration of one clock period of the clock signal. The 2T and 3T pulses have pulse durations of two clock and three clock periods, respectively. The pre-format signal to be supplied to the optical modulator is delayed a period 4T in shift register 1, is further delayed 0.2T in delay circuit 5, is varied in pulse duration in duty ratio adjustment circuits 6–8, and is amplified in VCA 11 and drive circuit 17.

The pre-format pulses, delayed 1T, 2T and 3T, respectively, by shift register 1 are supplied to the pulse detectors 2, 3, and 4, respectively. Each of the pulse detectors 2, 3, and 4 is constituted, for example, by two timers and a gate circuit. For example, the 3T timer may comprise a first timer which generates a 2.5T pulse in response to the leading edge of any input pulse. Thus, each of the pulses 1T, 2T and 3T will generate a corresponding 2.5T pulse, as shown in the fourth waveform of FIG. 2(a). The second timer responds to the lagging edge of the 2.5T pulses applied thereto to generate 1T pulses. This is seen in the fifth waveform in FIG. 2(a). Considering the input pulse train to the 3T detector and the two timers as described, it will be appreciated that only the 3T pulse results in a 1T output from the second timer that brackets the trailing edge of the 3T pulse.

The input pulse train and the second timer pulses are applied to a gate circuit and then to a 3.4T pulse generator which is triggered by a trailing edge pulse passed through the gate circuit. As a consequence, only the trailing edge of the 3T input pulse, gated by a 1T second timer pulse, triggers the generator to generate the 3.4T window pulse.

The 2T detector operates identically except that the first timer generates a pulse of 1.5T duration. The 1T timer operates identically except that the first timer generates a pulse of 0.5T duration.

Upon generation of the 3T window pulse, the gain control signal generation circuit 14 and the duty ratio adjustment circuit 8 operate so that the 3T pulse having an adjusted pulse duration is supplied to the signal input terminal of the VCA 11 and the gain control signal is supplied to the gain control input terminal of the VCA 11 through the adders 16 and 15. As a result, the 3T pulse signal having the adjusted pulse duration and amplitude is obtained at the output terminal of the VCA 11. Similarly to this, the 1T and 2T pulse signals are adjusted in duration and amplitude.

One example of a duty ratio adjustment circuit which may be used for circuit 6, 7 and 8 is described in JPA 63-298200, referred to above.

In the case of an optical disk of the CAV type, it is possible to more suitably compensate the setting of the duty ratio and amplitude of a pulse signal in accordance with a recording position in the radial direction of the disk, by causing the light beam position detector 20 to operate.

Thus, the 1T pulse of the pre-format signal used for forming so-called wobbled pits, so-called clock pits, and the like is adjusted so as to have a short duration and a large pulse amplitude. The 2T and 3T pulses of the pre-format signal are adjusted so as to have suitable durations and relatively small pulse amplitudes.

If the intensity of the recording light beam is adjusted on the basis of the adjusted pre-format signal as described above, the shape of a pit corresponding to the 1T pulse is made to have a pit length which is short and a pit width made large in the radial direction of the disk. Therefore, the crosstalk component of the read signal obtained by reading the pits will be at a necessary level and will satisfy a standardized half-amplitude level. Each of the pits corresponding to the 2T and 3T pulses has a pit width which is suppressed and which is made more uniform. Consequently, the occurrence of hump in a readout signal is suppressed.

Figure 2B:
FIG. 2(B) is a diagram for explaining the comparison between the shape of pits formed by the apparatus according to the present invention.
Figure 3:
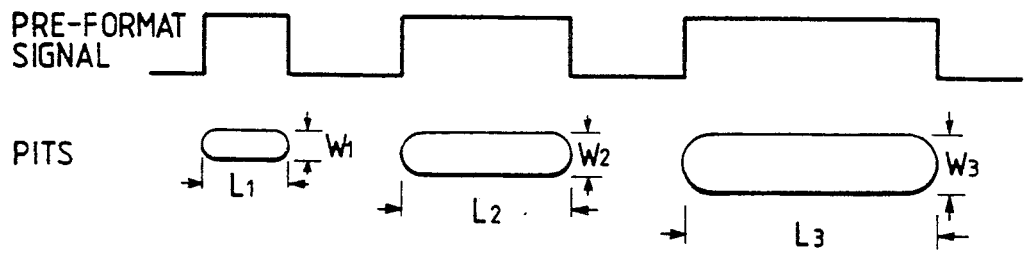
FIG. 3 is a diagram showing the shape of pits formed on a disk.

Further, the energy of the recording light beam is controlled by increasing the amplitude of the leading edge of each of the gain control signals produced from the gain control signal generation circuits 12 through 14, as shown in the last waveform of FIG. 2(A). By so doing, the radial width of each of the pits can be made more uniform. FIG. 2(B) shows the shapes of pits in this case. As seen from FIG. 2(B), each pit is made substantially constant in width at its front edge portion, at its central portion, and at its rear edge portion. Thus, the variations in pit width is suppressed.

The present invention is not limited to the sampling servo system, but can be applied to a continuous servo system as well as to a generally-used optical disks and magnetooptical disks.

As one specific example of the adjustments in duration and amplitude of the pre-format pulses; the 1T pre-format pulse having an amplitude 1A is adjusted to have a duration of 0.9T and an amplitude of 1A; the 2T pulse with a 1A amplitude is adjusted to have a 1.9T duration and a 0.8A amplitude; the 3T pulse with a 1A amplitude is adjusted to have a 2.9T duration and a 0.6A amplitude.

As described above, in the optical recording apparatus according to the present invention, the pulse amplitude and pulse duration of a pulse signal for modulating a light beam are adjusted in accordance with the pulse duration of a recording pulse signal or in accordance with the pulse duration of a recording pulse signal and a recording position of the recording pulse signal in the radial direction of a recording disk. Advantageously, therefore, a hump is hardly generated in each of the pits, and a pit, from which a crosstalk component having a suitable level is obtained, can be formed in a disk. Further, in the optical disk according to the present invention, each of the pits is made substantially constant in width in the radial direction of a disk at its front edge portion, at its central portion, and at its rear edge portion, and consequently, the hump is hardly generated.

What is claimed is:

1. An optical recording apparatus for forming a row of pits in an optical recording medium in accordance with a plurality of external pulse signals which vary in pulse duration in units 1T of a minimum time duration, said optical recording apparatus comprising:
   a pulse duration detection means for detecting the pulse duration of pulses in a plurality of the external pulse signals received by the recording apparatus;
   a duty ratio adjustment means for producing output pulse signals and for adjusting the duration of output pulses in accordance with said detected pulse duration;
   a pulse amplitude adjustment means for adjusting the amplitude of said output pulses in accordance with said detected pulse duration; and a light irradiation means for irradiating said optical recording medium with a light beam modulated by said output pulses having a duration adjusted by said duty ratio adjustment means and an amplitude adjusted by said pulse amplitude adjusting means while rotating said optical recording medium.

2. An optical recording apparatus for forming a row of pits by irradiating an optical disk with a light beam modulated in accordance with a plurality of external pulse signals which vary in pulse duration in units 1T of a minimum time duration while said optical disk is being rotated, said optical recording apparatus comprising:
 a pulse duration detection means for detecting the pulse duration of a plurality of the external pulse signals received by the recording apparatus;
 an irradiated position detection means for detecting an irradiated position of said disk irradiated with said light beam in a radial direction of said disk;
 a duty ratio adjustment means for producing output pulse signals and adjusting the duration of output pulse signals in accordance with the detected pulse duration and the detected irradiated position;
 a pulse amplitude adjustment means for adjusting the amplitude of said output pulse signal in accordance with the detected pulse duration and the detected irradiated position; and
 means for supplying said output pulse signals each having a duration adjusted by said duty radio adjustment means and having an amplitude adjusted by said pulse amplitude adjustment means to a light modulation means for modulating intensity of said light beam.

3. An optical recording apparatus according to claim 1 or 2, in which said pulse amplitude adjustment means adjusts the amplitude of the output pulse signal so that the amplitude is larger at a leading edge portion than at the remainder of the pulse.

4. An optical recording apparatus according to claim 1, further comprising:
 shift register means for shifting said input pulse signals a plurality of times in units of 1T; and
 wherein said pulse duration detection means comprises a plurality of pulse detectors, each coupled to said shift register, for detecting pulses of a predetermined duration from said shifted input pulse signals.

5. An optical recording apparatus according to claim 4, further comprising a plurality of level setting means, each coupled to respective ones of said plurality of pulse detectors, for setting the amplitude level of corresponding ones of said output pulse signals upon detection of a predetermined pulse duration.

6. An optical recording apparatus according to claim 2, further comprising:
 shift register means for shifting said input signal a plurality of times in units of 1T; and
 wherein said pulse duration detection means comprises a plurality of pulse detectors, each coupled to said shift register, for detecting pulses of a predetermined duration from said shifted input signal.

7. An optical recording apparatus according to claim 6, further comprising a plurality of level setting means, each coupled to respective ones of said plurality of pulse detectors, for setting the amplitude level of corresponding ones of said output pulse signals upon detection of a predetermined pulse duration.

* * * * *